254-283
SR
OR RE 488
J. SCHAFFER.
Capstan for Steamboats.
No. 488
Reissued Aug. 25, 1857
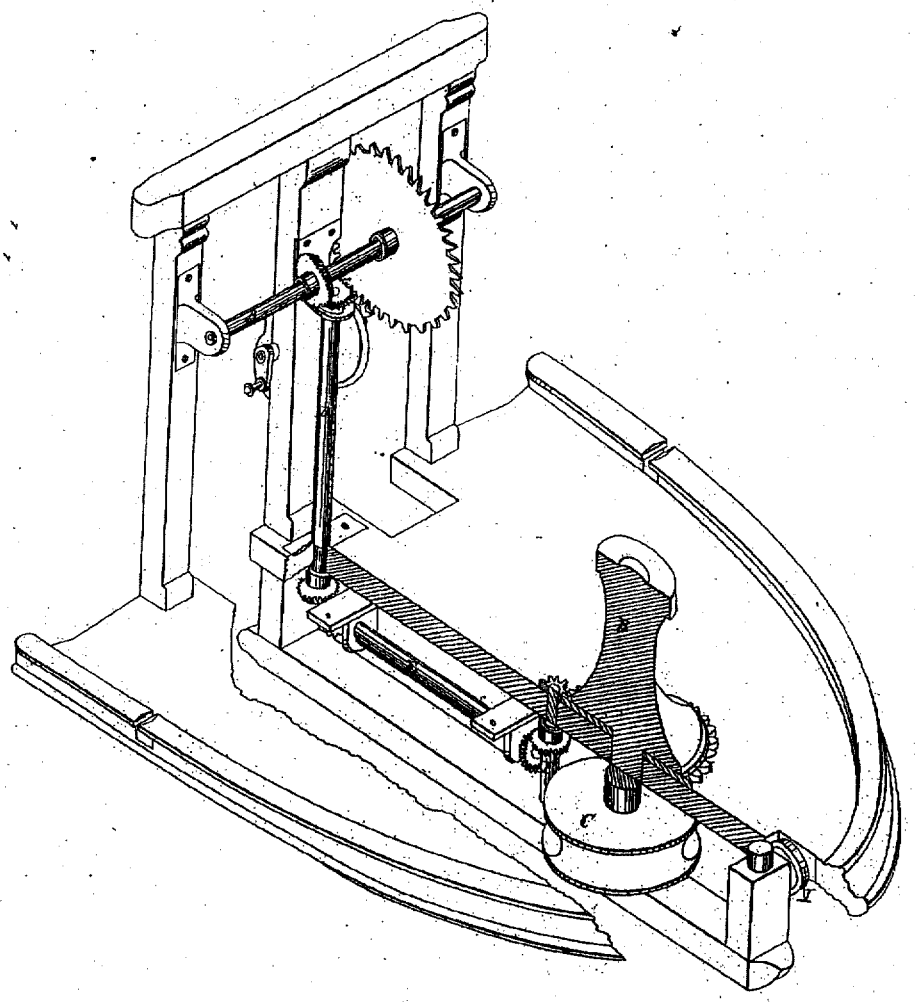

UNITED STATES PATENT OFFICE.

JOHN SCHAFFER, OF WEST MANCHESTER, PENNSYLVANIA.

IMPROVEMENT IN CAPSTANS FOR STEAMBOATS.

Specification forming part of Letters Patent No. 15,954, dated October 21, 1856; Reissue No. 488, dated August 25, 1857.

*To all whom it may concern:*

Be it known that I, JOHN SCHAFFER, of West Manchester, Allegheny county, Pennsylvania, have invented new and useful improvements in operating perpendicular capstans on western steam craft and locating pulleys to be operated in connection with such capstans on such boats; and I do hereby declare the following to be a full, clear, and exact description of the same, reference being had to the annexed drawings, made part of and lettered to correspond with this specification.

The nature of my invention consists in the mechanical arrangement connecting the shaft A, usually driven by the "little nigger," with a perpendicular capstan, B, by means of the shafts D, E, and F, suitably geared to convey motion to the capstan, which is also arranged to operate with a drum, C, or its equivalent, so that the usual derrick fall and spar-line and shore-line or other ropes can be hauled in or thrown off, and the steamboat thereby shoved or otherwise handled without the use of hand spikes to operate the capstan or hands to heave up the spar, thus avoiding the risk of killing men by the breakage of the spar or derrick under such heavy strain as shoving the boat puts upon these parts, and also leaving the deck free for freight.

The drawing shows in isometrical perspective the bow of a western steamboat as far back as the cargo-hoisting shaft A, driven by an auxiliary engine, termed in cant phrase the "little nigger," not shown because it is in ordinary use. The deck is shown partly broken out at the near side and longitudinally in central section. The capstan is also in central and vertical section, the moving parts directly connected with it being also in section as low as the deck is thick. The shaft D is perpendicular to the shaft A, and is driven and drives by mitered wheels. The shaft E is horizontal and below deck, gearing at its aft end by a mitered wheel to the similar wheel on the shaft D, and geared at its fore end by a similar wheel meshing into another such wheel on the vertical shaft, F, which, passing up through the deck, carries on its upper end a pinion-wheel that meshes into a wheel on the base of the capstan, and thus conveys motion by power thereto. The drum C is carried by the shaft of the capstan, and the drum or its equivalent can haul in any rope guided to it by the pulley I, which may be located as shown, or in some other convenient position in reference to the drum C or its equivalent.

It will be obvious to persons acquainted with navigation on the Ohio or other western waters that in passing a shoal the boat universally grounds at low stages of water. Under such circumstances, and as at present practiced, all hands are called to man the capstan and handle the ropes aforementioned, thus crowding and obstructing the deck, and being thus employed at the very time their services are elsewhere and otherwise wanted. All this my improvement, as before cited, obviates, both in regard to the capstan or the ropes operated by it or the drum C; and, moreover, my improvement effects this with a smaller crew than it requires to handle a boat under the old system. Moreover, when it is necessary to land the boat in port my improvement enables me to do so without delay, no matter what the force of the current of the river, nor what may be the number of boats above or below the landing spot selected, and this spot is usually selected wherever the boat can best wedge in. A whole day (and sometimes two or three days) is taken up in doing this by hand. It will therefore be obvious to persons aware of the condition of things as cited that my improvement (and I am an engineer of some years' experience on western boats) is no trifling matter.

My improvement is the result of close observation and effort to operate the capstan and drums by power derived from the auxiliary engine, which, being introduced on board of western steam craft for hoisting and lowering cargo, suggested to me that a plan could be contrived to cause it also to operate the capstan and other drums than the cargo-hoisting drums without interference therewith; and, moreover, this introduction of this auxiliary engine made practicable that which had never before been attempted—viz., driving the capstan and operating the spar-line by power—the fact being well known and self-evident that the propelling engines of a western steam craft cannot be applied to operate the capstan, although the Shreve snag-boat was well known to western rivermen. Furthermore, the adoption of the auxiliary engine for hoisting cargo did not suggest to mere mechanical skill the improvement I have made. Even after I contrived the plan it was doubted if the teeth of the wheels could be made to mesh or kept from binding at all times under the springing of the hull of the boat during the tremendous strains and twists it undergoes during its handling at low-water stages.

I claim—

The drum C on the shaft of the capstan B, as arranged, the capstan being steam-driven by geared shafting connecting it with the little nigger, and the whole being combined and made operative through the pulley I, substantially in the manner and for the purpose described.

JOHN SCHAFFER.

Attest:

CHAS. S. FRISBEE,

J. S. HADLY.